(12) United States Patent
Hironaka

(10) Patent No.: US 10,210,893 B2
(45) Date of Patent: Feb. 19, 2019

(54) MAGNETIC DISK DEVICE AND METHOD OF SETTING ON-TRACK DETERMINATION NUMBER OF MAGNETIC DISK DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventor: Hideki Hironaka, Machida Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/900,906

(22) Filed: Feb. 21, 2018

(65) Prior Publication Data

US 2018/0336923 A1 Nov. 22, 2018

(30) Foreign Application Priority Data

May 18, 2017 (JP) .................................. 2017-098975

(51) Int. Cl.
  *G11B 5/54* (2006.01)
  *G11B 5/596* (2006.01)
  *G11B 5/55* (2006.01)

(52) U.S. Cl.
  CPC ........ *G11B 5/59627* (2013.01); *G11B 5/5547* (2013.01); *G11B 5/5582* (2013.01)

(58) Field of Classification Search
  CPC ..... G11B 5/6005; G11B 5/59633; G11B 5/54; G11B 5/5547; G11B 21/083; G11B 5/59677; G11B 5/5526; G11B 5/596; G11B 5/59611; G11B 5/5556; G11B 5/5539
  USPC ... 360/78.11, 78.05, 75, 77.06, 97.12, 97.19, 360/78.14, 77.02, 78.04, 77.07, 78.09
  See application file for complete search history.

(56) References Cited

U.S. PATENT DOCUMENTS

| | | | |
|---|---|---|---|
| 6,795,262 B1 | 9/2004 | Codilian et al. | |
| 6,882,489 B1 | 4/2005 | Brunnett et al. | |
| 6,975,468 B1 | 12/2005 | Melrose et al. | |
| 7,321,477 B2 | 1/2008 | Suzuki et al. | |
| 7,515,377 B2* | 4/2009 | Funabashi ............ | G11B 5/5582 360/78.04 |
| 7,545,593 B1 | 6/2009 | Sun et al. | |
| 7,561,365 B2 | 7/2009 | Noguchi et al. | |

FOREIGN PATENT DOCUMENTS

JP  2001-283544 A  10/2001

* cited by examiner

*Primary Examiner* — Nabil Z Hindi
(74) *Attorney, Agent, or Firm* — White & Case LLP

(57) ABSTRACT

According to an embodiment, a magnetic disk, a magnetic head, an actuator and a processing unit are provided. The processing unit acquires a feature amount from a position error between a demodulated position and an estimated position of the magnetic head based on a frequency resonance characteristic of the actuator or a frequency characteristic of vibration caused by disturbance of the actuator and, based on the feature amount, sets an on-track determination number used for confirming an on-track state of the magnetic head after seeking.

14 Claims, 7 Drawing Sheets

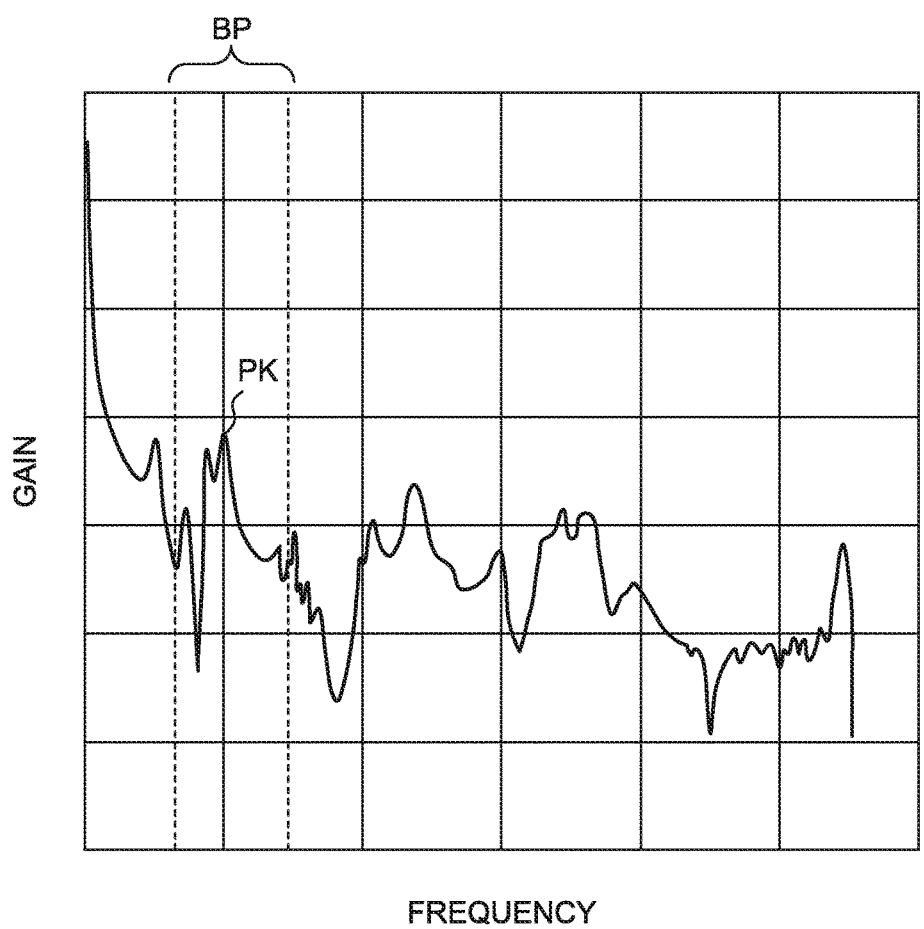

MAGNETIC DISK DEVICE AND METHOD OF SETTING ON-TRACK DETERMINATION NUMBER OF MAGNETIC DISK DEVICE

CROSS-REFERENCE TO RELATED APPLICATIONS

This application is based upon and claims the benefit of priority from Japanese Patent Application No. 2017-098975, filed on May 18, 2017; the entire contents of which are incorporated herein by reference.

FIELD

Embodiments of the present invention relate to a magnetic disk device and a method of setting on-track determination number of the magnetic disk device.

BACKGROUND

In a magnetic disk device, when writing or reading with respect to the magnetic disk is performed after seeking, an on-track state of a magnetic head after seeking is confirmed.

BRIEF DESCRIPTION OF THE DRAWINGS

FIG. 4 is a diagram illustrating an example of frequency resonance characteristic of the actuator used in the magnetic disk device according to an embodiment;

DETAILED DESCRIPTION

According to an embodiment, a magnetic disk, a magnetic head, an actuator, and a processing unit are provided. The magnetic head accesses the magnetic disk. The actuator causes the magnetic head to seek on the magnetic disk. The processing unit acquires a feature amount from a position error between a demodulated position and an estimated position of the magnetic head based on a frequency resonance characteristic of the actuator or a frequency characteristic of vibration caused by disturbance of the actuator and, based on the feature amount, sets an on-track determination number used for confirming an on-track state of the magnetic head after seeking.

Hereinafter, with reference to the accompanying drawings, a magnetic disk device and a method of setting the on-track determination number according to embodiments will be described in detail. The present invention is not limited by these embodiments.

Figure 1A:
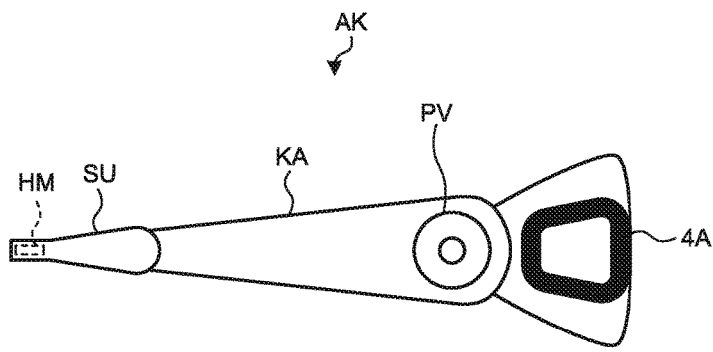
FIG. 1A is a plan view illustrating a schematic configuration example of an actuator used in a magnetic disk device according to an embodiment.
Figure 1B:
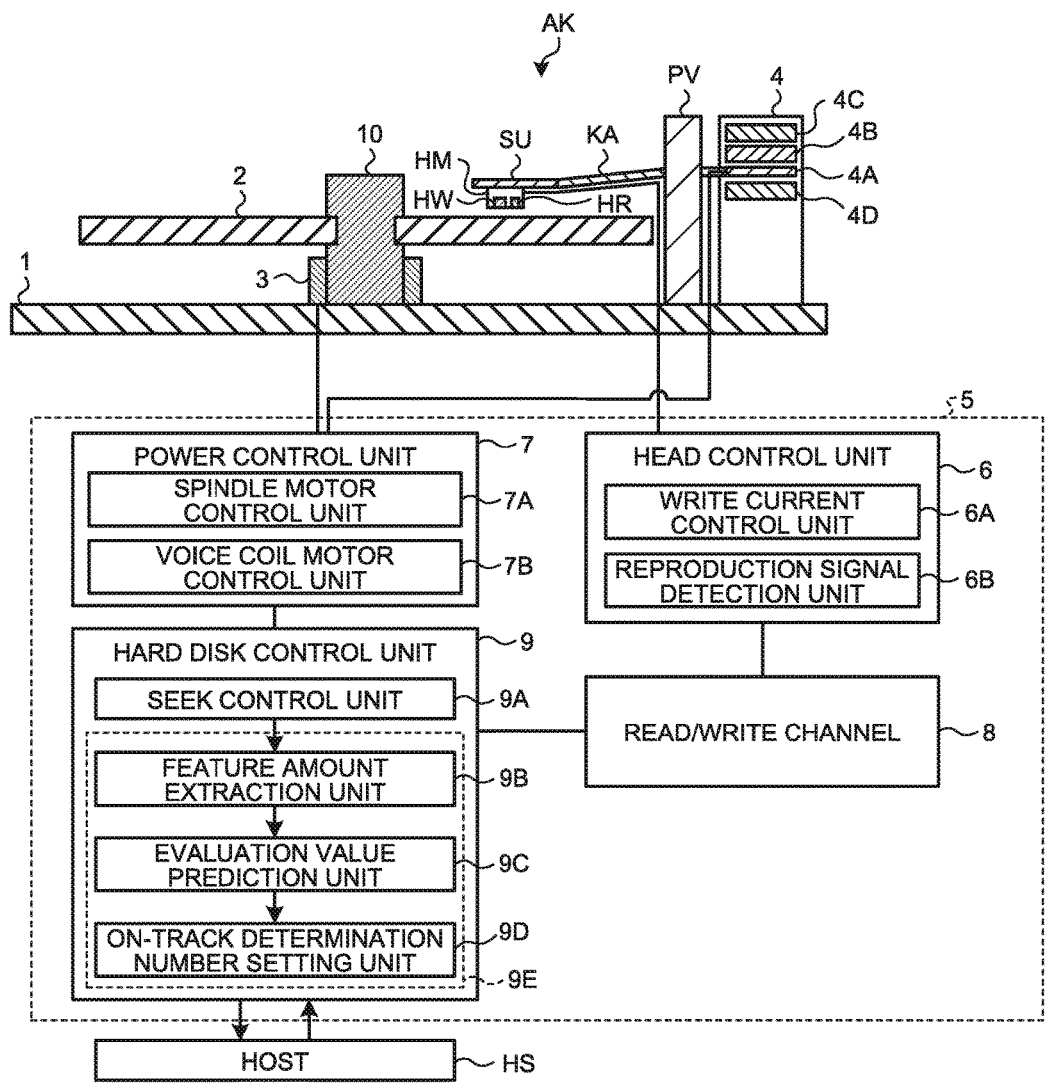
FIG. 1B is a block diagram illustrating a schematic configuration example of the magnetic disk device according to an embodiment.

FIG. 1A is a plan view illustrating a schematic configuration example of an actuator used in a magnetic disk device according to an embodiment, and FIG. 1B is a block diagram illustrating a schematic configuration example of the magnetic disk device according to an embodiment.

In FIGS. 1A and 1B, the magnetic disk device is provided with a magnetic disk 2, and the magnetic disk 2 is supported on the base 1 via a spindle 10. Further, an actuator AK is provided in the magnetic disk device. A head slider HM is provided at a front end of the actuator AK, and a voice coil 4A is provided at a rear end of the actuator AK. The head slider HM is provided with a write head HW and a read head HR as magnetic heads. The write head HW and the read head HR are arranged to face the magnetic disk 2.

The head slider HM is connected to a carriage arm KA via a suspension SU, and the carriage arm KA is supported on the base 1 via a pivot PV. The carriage arm KA can slide the head slider HM in a horizontal plane at the time of seeking or the like. The suspension SU can keep a floating amount of the magnetic head on the magnetic disk 2 constant by giving the magnetic head a pressing force against a levitation force of the magnetic head due to air flow when the magnetic disk 2 is rotating. The suspension SU can be constituted by a plate spring.

Figure 2A:
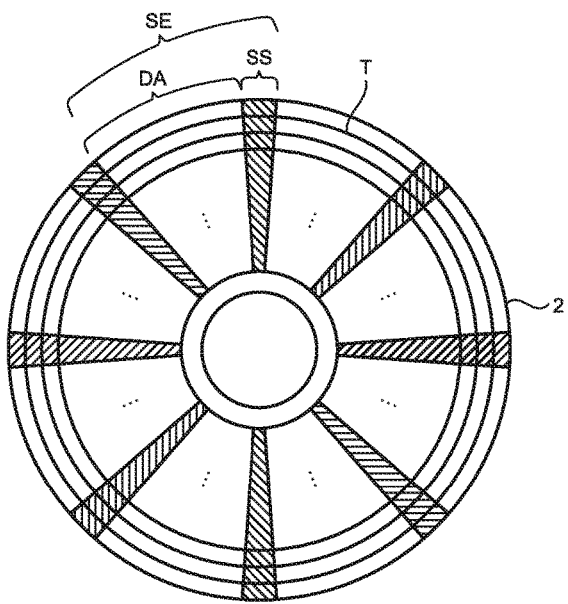
FIG. 2A is a plan view illustrating a track arrangement in the magnetic disk of FIG. 1A.
Figure 2B:
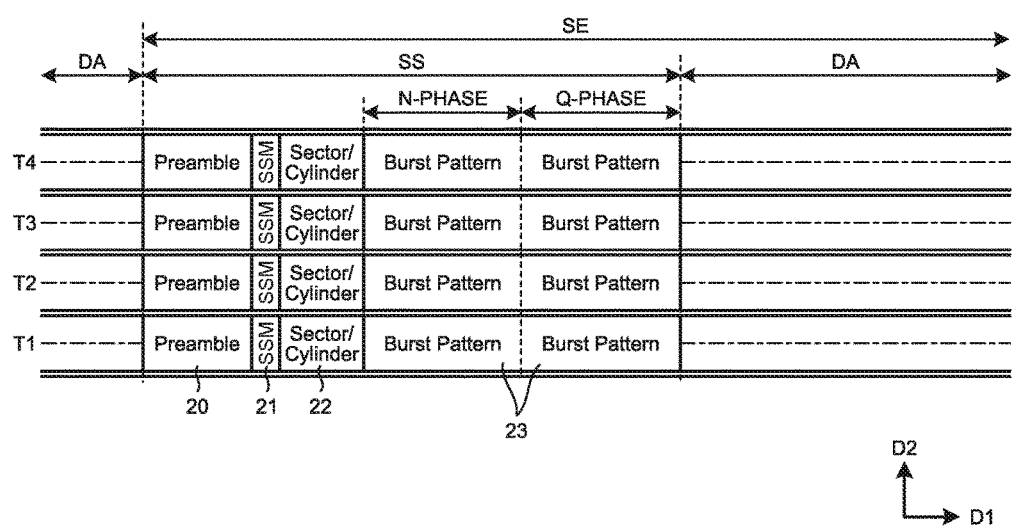
FIG. 2B is a diagram illustrating a configuration example of a servo area of FIG. 2A.

FIG. 2A is a plan view illustrating a track arrangement in the magnetic disk of FIG. 1A, and FIG. 2B is a diagram illustrating a configuration example of a servo area of FIG. 2A.

In FIGS. 2A and 2B, X (X is an integer of 2 or more) tracks T are provided in the magnetic disk 2 along a down track direction D1 (also referred to as a circumferential direction). Each track T is provided with data areas DA in which user data is written and servo areas SS in which servo data is written.

The servo areas SS are arranged radially, and the data area DA is arranged between the servo areas SS in the down track direction D1. The servo area SS can be equally divided into M (M is an integer of 2 or more) parts radially. A sector SE is constituted by the data areas DA and the servo area SS which are equally divided into M parts.

In the servo area SS, a preamble 20, a servo mark 21, sector/cylinder information (gray code) 22 and a burst pattern 23 are recorded. The servo mark 21 can indicate start of the servo area SS on the track T. The sector/cylinder information 22 can give servo addresses (also referred to as address information) of the magnetic disk 2 in the down track direction D1 and a cross track direction D2 (also referred to as a radial direction). As a servo address in the down track direction D1, a value from 0 to M−1 can be given sequentially for each sector SE which is equally divided into M parts. As the servo address in the cross track direction D2, a value from 0 to X−1 can be sequentially given for each of X tracks T.

As the burst pattern 23, a phase pattern having an N-phase and a Q-phase can be used. A magnetization pattern can be arranged in the down track direction D1 so that phases of the N-phase and the Q-phase are different from each other in the cross track direction D2. In other words, the magnetization pattern may be arranged such that polarities of the N-phase and the Q-phase are alternately reversed at a phase interval of 180 degrees in the cross track direction D2. Further, the N-phase and the Q-phase are arranged with their phases shifted from each other by 90 degrees in the cross track direction D2.

For example, the N-phase may be arranged so that its polarity is reversed at a boundary between adjacent tracks T1 to T4, and the Q-phase may be arranged so that its polarity is reversed at the center of each track T1 to T4. The sector/cylinder information 22 and the burst pattern 23 may be used for seek control for moving the write head HW and the read head HR to a target track and a target sector. In addition, the sector/cylinder information 22 and the burst pattern 23 may be used for tracking control for positioning the write head HW and the read head HR within a track width of the target track.

Further, as illustrated in FIG. 1, the magnetic disk device is provided with a voice coil motor 4 for driving the carriage arm KA and a spindle motor 3 for rotating the magnetic disk 2 around the spindle 10.

The voice coil motor 4 is provided with a magnet 4B for applying a magnetic field to the voice coil 4A. The magnet 4B may be disposed on the voice coil 4A. A top yoke 4C is disposed on the magnet 4B, and a bottom yoke 4D is disposed under the voice coil 4A.

The magnet 4B, the top yoke 4C, the bottom yoke 4D, and the spindle motor 3 are fixed to the base 1. The base 1 may be configured by die casting of a metal such as Al.

The control unit 5 is provided with a head control unit 6, a power control unit 7, a read/write channel 8 and a hard disk control unit 9. Based on the servo data read by the read head HR, the control unit 5 may control positions of the write head HW and the read head HR with respect to the magnetic disk 2 or control the transmission of write data and read data to and from the host HS.

The head control unit 6 is provided with a write current control unit 6A and a reproduction signal detection unit 6B. The power control unit 7 is provided with a spindle motor control unit 7A and a voice coil motor control unit 7B.

The head control unit 6 amplifies or detects a signal at the time of recording/reproducing. The write current control unit 6A controls write current flowing through the write head HW. The reproduction signal detection unit 6B detects the signal read by the read head HR.

The power control unit 7 drives the voice coil motor 4 and the spindle motor 3. The spindle motor control unit 7A controls the rotation of the spindle motor 3. The voice coil motor control unit 7B controls driving of the voice coil motor 4. The voice coil motor 4 can rotate the voice coil 4A around the pivot PV by causing a VCM (Voice Coil Motor) current to flow through the voice coil 4A and can move the magnetic head on the magnetic disk 2.

The read/write channel 8 exchanges data between the head control unit 6 and the hard disk control unit 9. The data includes read data, write data and servo data. For example, the read/write channel 8 converts a signal reproduced by the read head HR into a data format handled by the host HS or converts data output from the host HS into a signal format recorded by the write head HW. Such format conversion may include DA conversion, AD conversion, encoding and decoding. In addition, the read/write channel 8 performs decoding processing of a signal reproduced by the read head HR or performs a code modulation on data output from the host HS.

The hard disk control unit 9 controls recording and reproduction based on a command from the outside (for example, the host HS) of the magnetic disk device or exchanges data between the outside and the read/write channel 8. The hard disk control unit 9 may be provided with a processor for controlling the recording and reproduction and a processor for controlling data transfer between the host HS and the read/write channel 8 separately. The processor used for controlling the recording and reproduction may also be used for controlling the data transfer. A CPU can be used as the processor.

The hard disk control unit 9 is provided with a seek control unit 9A and an on-track determination processing unit 9E. The on-track determination processing unit 9E is provided with a feature amount extraction unit 9B, an evaluation value prediction unit 9C and an on-track determination number setting unit 9D.

The seek control unit 9A can move the magnetic head to the target position by controlling the VCM current flowing through the voice coil 4A. The on-track determination processing unit 9E can predict a variation in the position of the magnetic head after seeking and can set the on-track determination number based on the prediction result. The on-track determination number can be used for confirming the on-track state of the magnetic head after seeking. The variation in the position of the magnetic head after seeking can be predicted based on the state of the magnetic head during seeking.

The feature amount extraction unit 9B can extract a feature amount serving as an indicator of the variation in the position of the magnetic head after seeking. This feature amount can be extracted during seeking. This feature amount can be extracted based on frequency resonance characteristic of the actuator AK or frequency characteristic of vibration caused by disturbance of the actuator AK. For example, as the feature amount, a frequency component serving as an indicator of the variation in the position of the magnetic head can be extracted from a position error between a demodulated position and the estimated position of the magnetic head. The demodulated position of the magnetic head can be obtained from a reading result of the servo data by the read head HR. The estimated position of the magnetic head can be obtained by a state observer simulating the operation of the actuator AK.

Based on the feature amount extracted by the feature amount extraction unit 9B, the evaluation value prediction unit 9C can predict the evaluation value that can evaluate the variation in the position of the magnetic head after seeking. The on-track determination number setting unit 9D can set the on-track determination number based on the evaluation value predicted by the evaluation value prediction unit 9C.

The control unit 5 is connected to the host HS. The host HS may be a personal computer that issues a write command, a read command, or the like to the magnetic disk device, or may be a network connectable to a server or the like. That is, the magnetic disk device can be used as an external storage device of the host HS. The magnetic disk device may be externally attached to the host HS or may be incorporated in the host HS.

When data is written to the magnetic disk 2, the magnetic disk 2 is rotated by the spindle motor 3. In addition, the write data specified by the write command from the host HS is sent to the read/write channel 8 via the hard disk control unit 9. Then, the write data is written in the area specified by the write command of the magnetic disk 2 via the write head HW.

When the write head HW is not in the area specified by the write command, the write head HW is moved to the area specified by the write command by controlling the VCM current by the seek control unit 9A. At this time, the feature amount extraction unit 9B extracts, during seeking, the feature amount serving as an indicator of the variation in the position of the magnetic head after seeking. Then, in the evaluation value prediction unit 9C, an evaluation value by which the variation in the position of the magnetic head may be evaluated is predicted based on the feature amount. Thereafter, in the on-track determination number setting unit 9D, the on-track determination number is set based on the evaluation value predicted by the evaluation value prediction unit 9C.

When it is evaluated that the variation in the position of the magnetic head is large based on the evaluation value, it is possible to increase the on-track determination number, thus lengthening the time to be taken until it is determined that the magnetic head is in the on-track state. On the other hand, when it is evaluated that the variation in the position of the magnetic head is small based on the evaluation value, it is possible to reduce the on-track determination number, thus shortening the time to be taken until it is determined that the magnetic head is in the on-track state.

When the on-track determination number is set, it is determined whether or not the position and a speed of the write head HW satisfy the on-track state. At this time, it is possible to determine whether or not the position and the speed of the write head HW satisfy the on-track state by confirming, as many times by the on-track determination number, whether or not the position and speed of the write head HW exceeds a slice at a seek destination. When the write head HW satisfies the on-track state, write is permitted and write data is written via the write head HW.

Here, by setting the on-track determination number on the basis of the evaluation value by which the variation in the position of the magnetic head can be evaluated, it is possible to delay start of writing until the position and the speed of the magnetic head are sufficiently stabilized when the variation in the position of the magnetic head is large, thus preventing a deterioration of write quality. On the other hand, when the variation in the position of the magnetic head is small, the writing can be started as soon as the position and the speed of the magnetic head are stabilized, thus speeding up the write operation.

Hereinafter, a configuration example and an operation example used for setting the on-track determination number will be described in detail.

Figure 3:
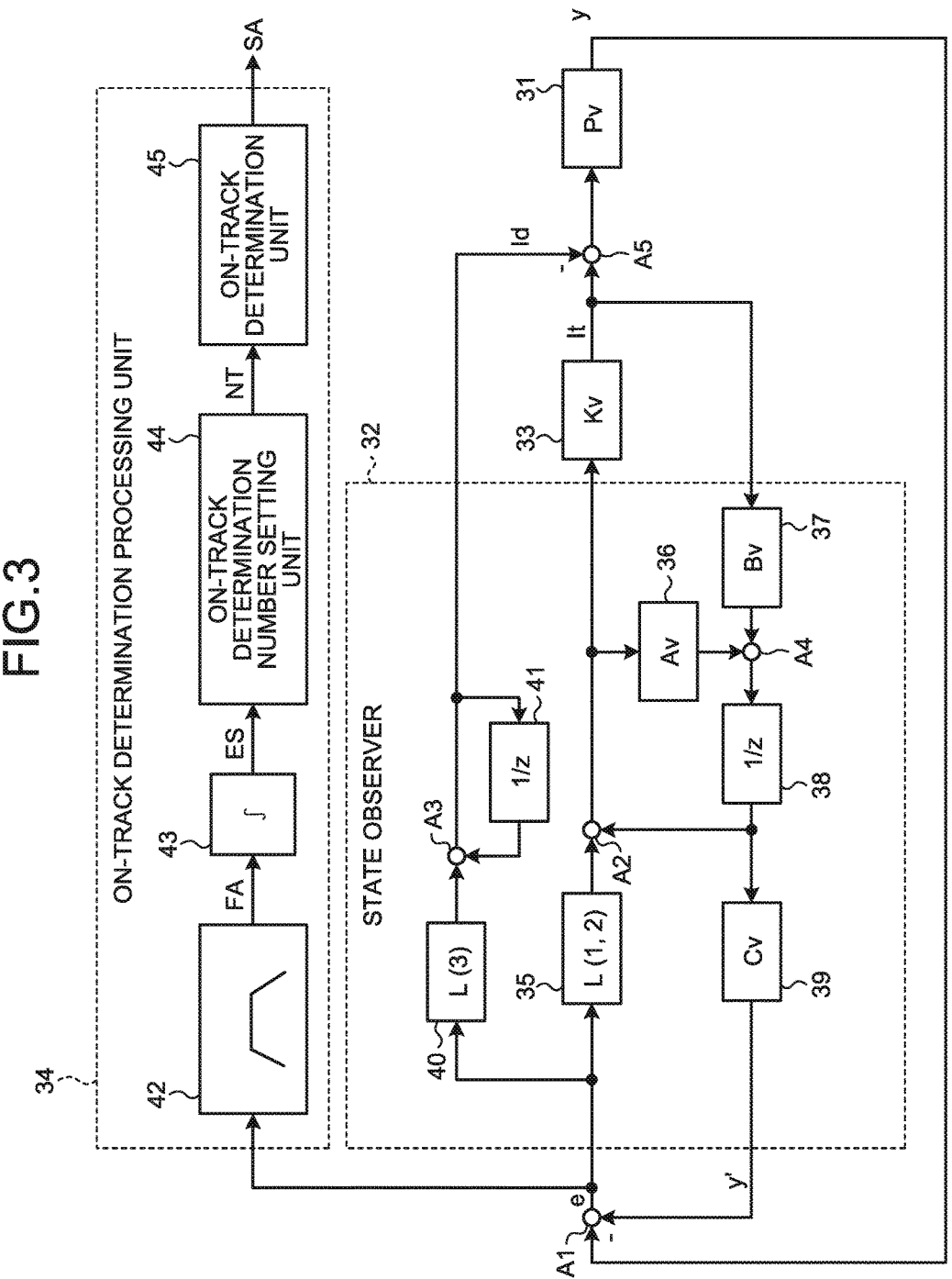
FIG. 3 is a block diagram illustrating a schematic configuration example of a seek control system and an on-track determination processing unit used in the magnetic disk device according to an embodiment.

FIG. 3 is a block diagram illustrating a schematic configuration example of a seek control system and an on-track determination processing unit used in the magnetic disk device according to an embodiment.

In FIG. 3, the seek control system can control a seek operation of a plant 31. The plant 31 can include the voice coil motor 4, the magnetic head, the magnetic disk 2, the reproduction signal detection unit 6B and the read/write channel 8 in FIG. 1B.

In the seek control system, a state observer 32, a state feedback control unit 33, and subtractors A1 and A5 are provided. The state observer 32 can estimate state amount of the voice coil motor 4 based on a mathematical expression model of the voice coil motor 4 of the plant 31. For example, the state observer 32 can estimate a speed, an acceleration or the like of the voice coil motor 4 as the state amount. Then, when a demodulated position y of the magnetic head and a target value It of the VCM current of the voice coil motor 4 are given, it is possible to output an estimated position y' of the magnetic head by using an estimation value of the state amount of the voice coil motor 4.

The state feedback control unit 33 can calculate the target value It of the VCM current of the voice coil motor 4 so that a position error e between the demodulated position y and the estimated position y' of the magnetic head approaches zero. At this time, the state feedback control unit 33 can calculate the target value It of the VCM current based on a calculation result of the estimation value of the state amount of the voice coil motor 4 and a feedback gain Kv.

The state observer 32 is provided with gain calculators 35 and 40, matrix calculators 36, 37 and 39, delay elements 38 and 41, and adders A2 to A4.

The gain calculator 35 can calculate the position error e and an observer gain L(1, 2). The observer gain L (1, 2) can include an observer gain L1 related to the position of the magnetic head and an observer gain L2 related to the speed of the magnetic head. The gain calculator 40 can calculate the position error e and an observer gain L3 related to an external force.

The matrix calculator 36 can calculate the estimation value of the state amount of the voice coil motor 4 and a system matrix Av. The matrix calculator 37 can calculate the target value It of the VCM current and an input matrix Bv. The matrix calculator 39 can calculate the estimation value of the state amount of the voice coil motor 4 and an output matrix Cv. At this time, it is possible to set the system matrix Av, the input matrix Bv, and the output matrix Cv so that an operation of the voice coil motor 4 can be simulated.

An on-track determination processing unit 34 can predict the variation in the position of the magnetic head after seeking and can set the on-track determination number based on the prediction result. In the on-track determination processing unit 34, a band pass filter 42, an integrator 43, an on-track determination number setting unit 44 and an on-track determination unit 45 are provided. The band pass filter 42 can be used as the feature amount extraction unit 9B in FIG. 1B. The integrator 43 can be used as the evaluation value prediction unit 9C in FIG. 1B.

The band pass filter 42 can receive the position error e as an input and output a feature amount FA. At this time, it is possible to set a pass band of frequency component of the position error e based on the frequency resonance characteristic of the actuator AK or the frequency characteristic of vibration caused by disturbance of the actuator AK. The integrator 43 can predict an evaluation value ES based on a result of integrating feature amounts FA at each sample point.

The on-track determination number setting unit 44 can set an on-track determination number NT based on the evaluation value ES predicted by the integrator 43. Based on the on-track determination number NT, the on-track determination unit 45 can determine whether or not the position and the speed of the magnetic head satisfy the on-track state.

An operation after starting the seeking of the seek control system and the on-track determination processing unit 34 illustrated in FIG. 3 will be described below.

Based on a servo pattern read by the magnetic head during seeking, the demodulated position y of the magnetic head is output from the plant 31 and is input to the subtractor A1. To the state observer 32, the target value It of the VCM current output from the state feedback control unit 33 and the position error e output from the subtractor A1 are input. Then, the estimated position y' of the magnetic head is output from the state observer 32 and is input to the subtractor A1.

In the subtractor A1, the position error e is calculated by subtracting the estimated position y' from the demodulated position y of the magnetic head, and is input to the gain calculator 35, the gain calculator 40, and the band pass filter 42. In the gain calculator 35, the position error e and the observer gain L(1, 2) are calculated, and the calculation result is input to the adder A2.

Further, an addition result by the adder A4 is delayed by the delay element 38, and is then input to the adder A2 and the matrix calculator 39. In the matrix calculator 39, the estimated position y' is calculated by computing an output of the delay element 38 and the output matrix Cv, and the estimated position y' is input to the subtractor A1. In the adder A2, the calculation result of the gain calculator 35 and the output of the delay element 38 are added, and the addition result is input to the state feedback control unit 33 and the matrix calculator 36.

In the matrix calculator 36, the addition result of the adder A2 and the system matrix Av are calculated, and the computation result is input to the adder A4. On the other hand, the target value It of the VCM current from the state feedback control unit 33 is input to the matrix calculator 37. In the matrix calculator 37, the target value It of the VCM current and the input matrix Bv are calculated and the calculation result is input to the adder A4.

In the adder A4, a calculation result of the matrix calculator 36 and a calculation result of the matrix calculator 37 are added, and the addition result is input to the adder A2 and the matrix calculator 39 via the delay element 38.

On the other hand, in the gain calculator 40, the position error e and the observer gain L(3) are calculated, and the calculation result is input to the adder A3. In addition, in the adder A3, the output of the adder A3 is input to the adder A3 via the delay element 41. In the adder A3, a disturbance component Id of the VCM current is calculated by adding a calculation result of the gain calculator 40 and the output of the adder A3, and the disturbance component Id is input to the subtractor A5. Further, the target value It of the VCM current from the state feedback control unit 33 is input to the subtractor A5.

In the subtractor A5, the disturbance component Id is subtracted from the target value It of the VCM current, and the subtraction result is input to the plant 31. In the plant 31, the VCM current is applied to the voice coil motor 4 based on the subtraction result of the subtractor A5.

On the other hand, in the band pass filter 42, the feature amount FA is extracted from the position error e during seeking, and is input to the integrator 43. In the integrator 43, the evaluation value ES is calculated by integrating the feature amount FA of each sample point, and is input to the on-track determination number setting unit 44.

At this time, the evaluation value ES can be given by the following equation (1), $$ES = \int (F(z) \times e) \quad (1)$$

where F(z) is a z-transformed transfer function of the band pass filter 42.

The integration of the feature amount FA can be started from a position ahead of a target cylinder at seeking by fixed number of samples. The fixed sample number can be set from several samples to several tens of samples. Here, by starting the integration of the feature amount FA from a position ahead of the target cylinder by the fixed number of samples, it is possible to prevent the evaluation value ES from increasing or decreasing according to a length of a seek distance. In order to prevent the evaluation value ES from increasing or decreasing according to the length of the seek distance, the feature amount FA is integrated from a start of seeking to an end of seeking, and a value obtained by dividing the integrated value by the seek distance may be used as the evaluation value ES.

In the on-track determination number setting unit 44, an on-track determination number NT is set based on the evaluation value ES calculated by the integrator 43, and is input to the on-track determination unit 45. In the on-track determination unit 45, it is determined whether or not the position and the speed of the magnetic head satisfy the on-track state based on the on-track determination number NT. When the position and the speed of the magnetic head satisfy the on-track state, a permission signal SA for reading or writing is output.

Here, the position error e can be input in parallel to the state observer 32 and the on-track determination processing unit 34. Then, the processing by the state feedback control unit 33 using the state observer 32 and the processing by the on-track determination processing unit 34 can be executed in parallel. Thus, the evaluation value ES can be predicted in real time at the current seeking, and the evaluation value ES predicted at the current seeking can be used for setting the on-track determination number after the current seeking.

FIG. 4 is a diagram illustrating an example of a frequency resonance characteristic of an actuator used in the magnetic disk device according to an embodiment.

In FIG. 4, a gain of the frequency resonance characteristic of the actuator AK has a peak in a specific band. At this time, in order to extract the feature amount serving as an indicator of the variation in the position of the magnetic head, the band BP including a peak position PK having the highest gain of the frequency component of the position error e may be set as a pass band of the band pass filter 42. It is possible to set the on-track determination number so that reading or writing can be started after the position of the magnetic head after seeking is stabilized by predicting the variation in the position of the magnetic head after seeking based on this feature amount.

In the example of FIG. 4, the method of setting the pass band of the band pass filter 42 based on the frequency resonance characteristic of the actuator has been described. However, the pass band of the band pass filter 42 may be set based on the frequency characteristic of the vibration caused by disturbance. The vibration caused by disturbance can be, for example, a vibration caused by rotation of a fan of a server in which the magnetic disk device is installed. At this time, the pass band of the band pass filter 42 can be set to, for example, 3 kHz or less.

Figure 5A:
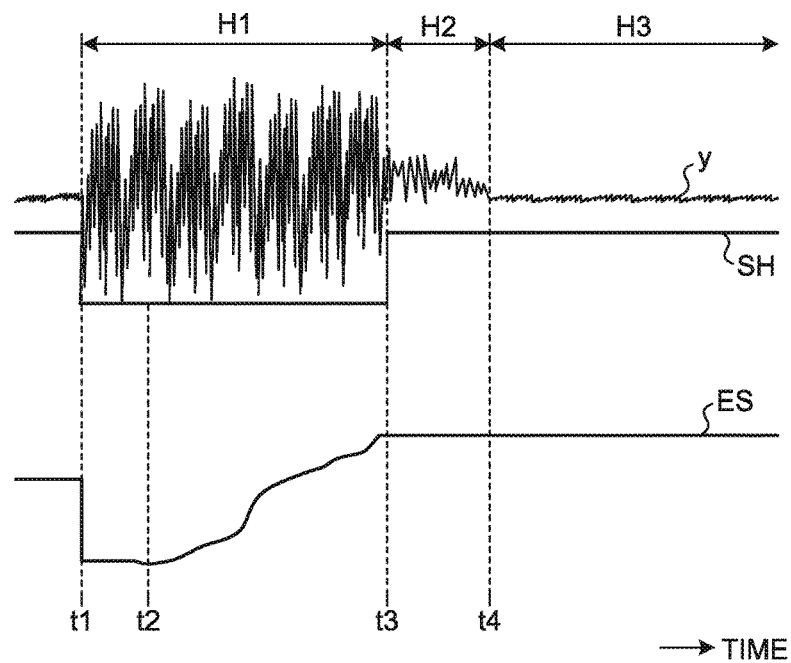
FIG. 5A is a timing chart illustrating a method of predicting an evaluation value when a variation in a position of a magnetic head after seeking is large.
Figure 5B:
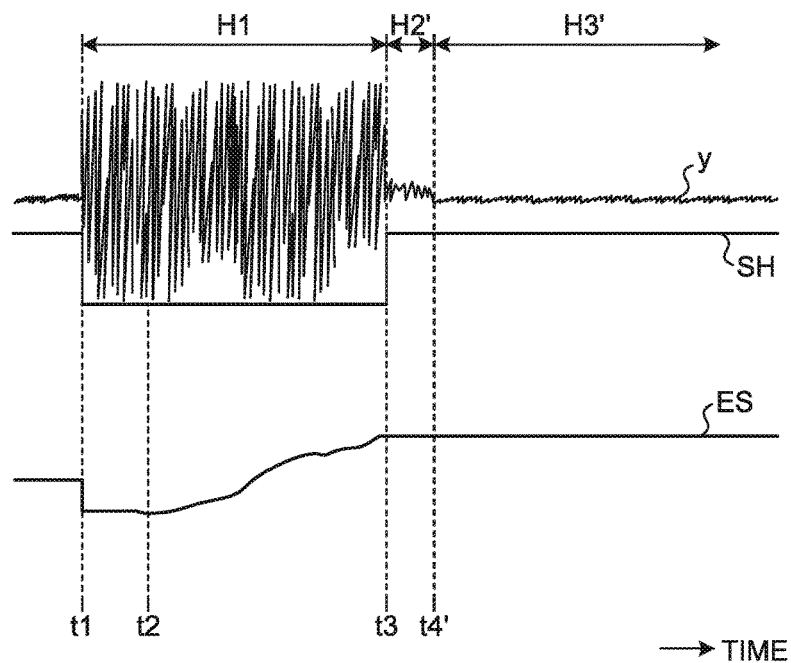
FIG. 5B is a timing chart illustrating a method of predicting an evaluation value when a variation in a position of the magnetic head after seeking is small.

FIG. 5A is a timing chart illustrating a method of predicting the evaluation value when the variation in the position of the magnetic head after seeking is large, and FIG. 5B is a timing chart illustrating a method of predicting the evaluation value when the variation in the position of the magnetic head after seeking is small.

In FIGS. 5A and 5B, when a seek instruction signal SH transits from a high level to a low level (t1), a seek period H1 is entered and seeking is started. When the seek instruction signal SH transits from the low level to the high level (t3), the seek period H1 ends and the seek is ended. In the seek period H1, the demodulated position y is turned back and output each time the magnetic head strides over one track. In the examples of FIGS. 5A and 5B, seeking is performed for 1000 tracks in the seek period H1.

When the variation in the position of the magnetic head after seeking is large, a settling period H2 is entered when the seek period H1 ends, as illustrated in FIG. 5A. When the variation in the position of the magnetic head after seeking is small, a settling period H2' is entered when the seek period H1 ends, as illustrated in FIG. 5B. The settling periods H2 and H2' are periods until the position of the magnetic head is stabilized after seeking. When the variation in the position of the magnetic head after seeking is large, it takes time until the position of the magnetic head becomes stable as compared with the case where the variation is small, so that the settling period H2 becomes longer than the settling period H2'.

A magnitude of the variation in the position of the magnetic head in the settling periods H2 and H2' reflects a magnitude of the variation in the position of the magnetic head in the seek period H1 immediately before the settling period H2 and H2'. The magnitude of the variation in the position of the magnetic head in the seek period H1 and the settling period H2 and H2' depends on the frequency resonance characteristic of the actuator AK or the frequency characteristic of the vibration caused by the disturbance of the actuator AK.

Therefore, by setting the pass band of the band pass filter 42 based on the frequency resonance characteristic of the actuator AK or the frequency characteristic of the vibration caused by the disturbance of the actuator AK, it is possible to extract the feature amount FA, which serves as an indicator of the variation in the position of the magnetic head in the settling periods H2 and H2', in the seek period H1. It is possible to calculate the evaluation value ES by integrating the feature amount FA during the seek period H1. The integration of the feature amount FA can be started from a position (t2) ahead of the target cylinder at seeking by fixed number of samples.

By calculating the evaluation value ES in real time in the seek period H1, it is possible to predict the variation in the position of the magnetic head in the settling periods H2 and H2' immediately after the seek period H1. By setting the on-track determination number NT based on the evaluation value ES, the settling period H2 when the variation in the position of the magnetic head is large may be made longer than the settling period H2' when the variation in the position of the magnetic head is small.

When the variation in the position of the magnetic head is large, a write period H3 (t4) is entered when the settling period H2 ends, as illustrated in FIG. 5A. When the variation in the position of the magnetic head is small, a write period H3' (t4') is entered when the settling period H2' ends, as illustrated in FIG. 5B.

Since the settling period H2 is longer than the settling period H2', the start of writing is delayed when the variation in the position of the magnetic head after seeking is large as compared with the case where the variation is small. Therefore, when the variation in the position of the magnetic head is large, the start of writing can be delayed until the position and the speed of the magnetic head are sufficiently stabilized, thus preventing a write quality from being deteriorated. On the other hand, when the variation in the position of the magnetic head is small, writing can be started as soon as the position and speed of the magnetic head are stabilized, thus speeding up the write operation.

Figure 6A:
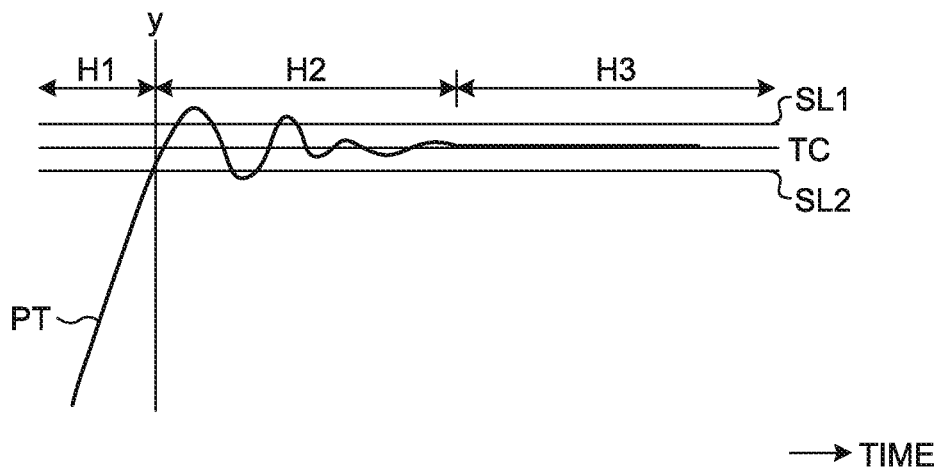
FIG. 6A is a diagram illustrating a locus of the magnetic head when a variation in a position of the magnetic head after seeking is large.
Figure 6B:
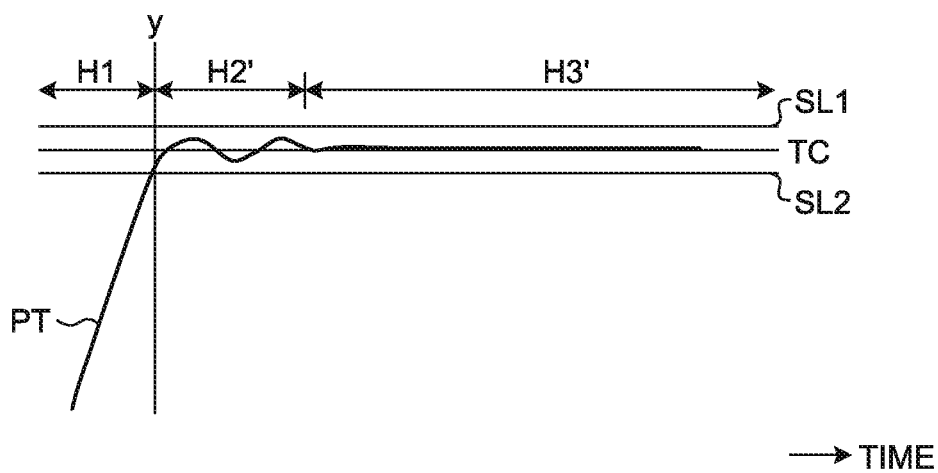
FIG. 6B is a diagram illustrating the locus of the magnetic head when the variation in the position of the magnetic head after seeking is small.

FIG. 6A is a diagram illustrating a locus of the magnetic head when the variation in the position of the magnetic head after seeking is large, and FIG. 6B is a diagram illustrating a locus of the magnetic head when the variation in the position of the magnetic head after seeking is small.

In FIGS. 6A and 6B, when the seek is started, the magnetic head reaches the target position along a locus PT. When the variation in the position of the magnetic head after the seeking is large, the settling period H2 is entered when the seek period H1 ends, as illustrated in FIG. 6A. When the variation in the position of the magnetic head after seeking is small, the settling period H2' is entered when the seek period H1 ends, as illustrated in FIG. 6B.

In the settling periods H2 and H2', the on-track state of the magnetic head is confirmed. In order to confirm the on-track state, off-track slices SL1 and SL2 are set with reference to a track center TC. In the settling periods H2 and H2', if it can be confirmed that the position of the magnetic head does not exceed the off-track slices SL1 and SL2 by the on-track determination number, it can be determined that the magnetic head is in the on-track state.

Here, by setting the on-track determination number based on the evaluation value ES, it is possible to increase the on-track determination number when the variation in the position of the magnetic head after seeking is large as compared with the case where the variation is small. Therefore, the settling period H2 when the variation in the position of the magnetic head is large can be made longer than the settling period H2' when the variation in the position of the magnetic head is small. As a result, when the variation in the position of the magnetic head is large, the start of writing can be delayed until the position and the speed of the magnetic head are sufficiently stabilized, and it is possible to prevent the deterioration of the write quality. On the other hand, when the variation in the position of the magnetic head is small, writing can be started as soon as the position and the speed of the magnetic head are stabilized, thus speeding up the write operation.

In FIGS. 6A and 6B, the method of confirming that the position of the magnetic head does not exceed the off-track slices SL1 and SL2 by the on-track determination number has been described. However, as for the speed of the magnetic head, the on-track state can be confirmed in the same manner.

Figure 7:
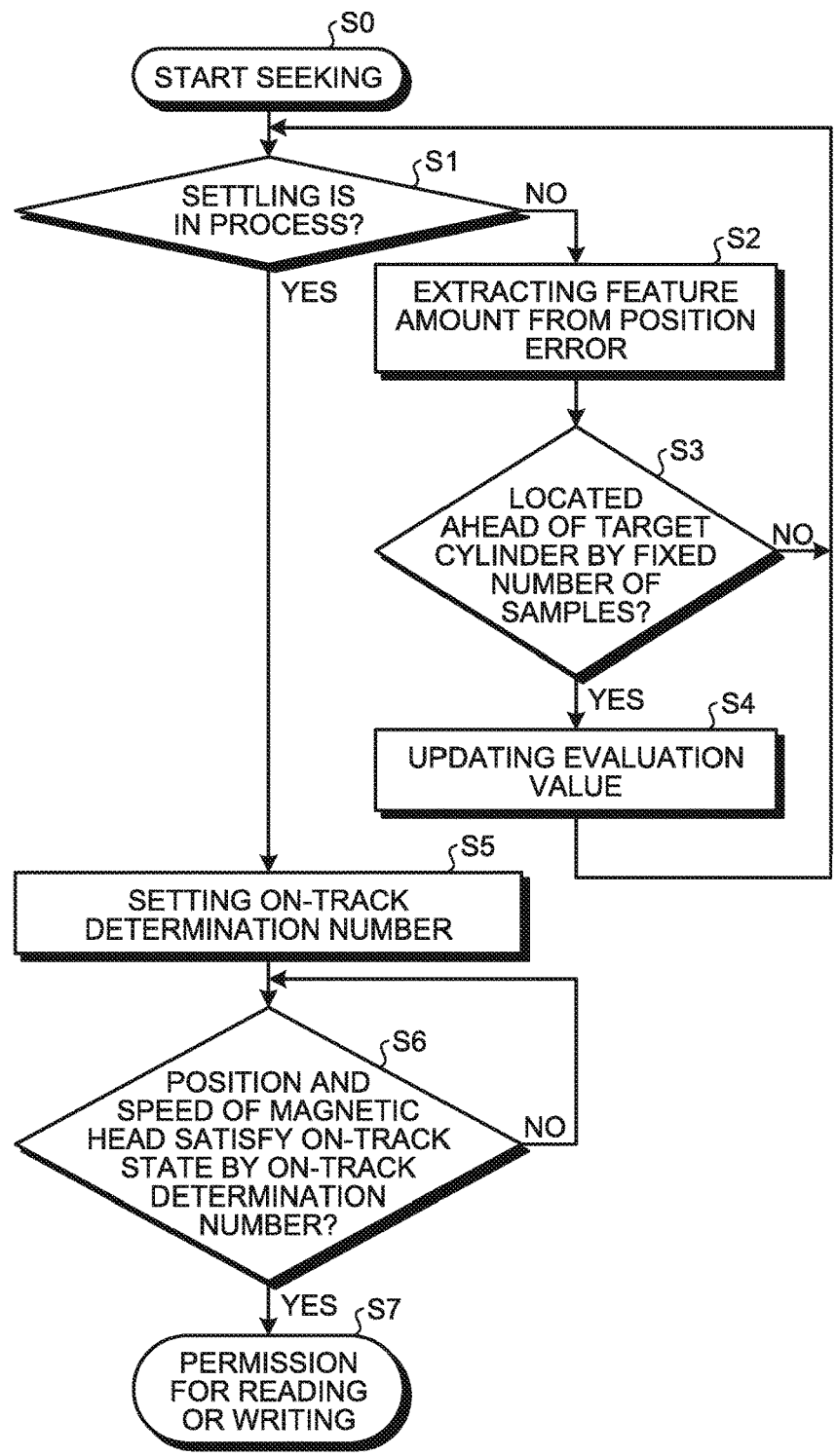
FIG. 7 is a flowchart illustrating an on-track determination processing method of the magnetic disk device according to an embodiment.

FIG. 7 is a flowchart illustrating an on-track determination processing method of the magnetic disk device according to an embodiment.

In FIG. 7, when the seek is started (S0), it is determined whether or not settling is in progress (S1). The settling refers to a settling motion of the magnetic head after seeking. If the settling is not in process, the feature amount is extracted from the position error during seeking (S2).

Subsequently, it is determined whether or not the current position of the magnetic head is located ahead of the target cylinder at seeking by the fixed number of samples (S3). In the case where the current position of the magnetic head is located ahead of the target cylinder at seeking by the fixed number of samples, the feature amount is integrated to the evaluation value one sample earlier, whereby the evaluation value of the current sample is calculated, and the process returns to S1 (S4).

On the other hand, in S3, if the current position of the magnetic head is not located ahead of the target cylinder at seeking by the fixed number of samples, the process returns to S1.

On the other hand, when the settling is in process in S1, on-track determination number is set based on the evaluation value calculated in S4 (S5).

Subsequently, it is determined whether or not the position and the speed of the magnetic head satisfy the on-track state by the on-track determination number (S6). At this time, the position of the magnetic head can be obtained from the demodulated position y of the magnetic head. The speed of the magnetic head can be obtained from a difference between the current sample value at the demodulated position y of the magnetic head and the previous sample value.

When the position and the speed of the magnetic head satisfy the on-track state by the on-track determination number, a permission for reading or writing is issued (S7). On the other hand, in S6, if the position and the speed of the magnetic head do not satisfy the on-track state by the on-track determination number, the processing in S6 is repeated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a magnetic disk;
   a magnetic head that accesses the magnetic disk;
   an actuator that causes the magnetic head to seek on the magnetic disk; and
   a processing unit that acquires a feature amount from a position error between a demodulated position and an estimated position of the magnetic head based on a frequency resonance characteristic of the actuator or a frequency characteristic of vibration caused by disturbance of the actuator and, based on the feature amount, sets an on-track determination number used for confirming an on-track state of the magnetic head after seeking;
   wherein the processing unit includes:
   a filter that has a pass band of a frequency component of the position error, the pass band being set based on the frequency resonance characteristic of the actuator or the frequency characteristic of vibration caused by disturbance of the actuator, receives the position error as an input, and outputs the feature amount; and
   an integrator that predicts an evaluation value based on a result of integrating the feature amount of each sample point,
   wherein the on-track determination number is set based on the evaluation value.

2. The magnetic disk device according to claim 1, wherein a seek control based on the position error and the prediction of the evaluation value based on the position error are executed in parallel.

3. The magnetic disk device according to claim 1, wherein the integrator integrates the feature amount from a position ahead of the target cylinder at seeking by a fixed number of samples.

4. The magnetic disk device according to claim 2, wherein the integrator integrates the feature amount from a position ahead of the target cylinder at seeking by a fixed number of samples.

5. The magnetic disk device according to claim 1, wherein the pass band of the filter includes a band of a peak position where a gain of the frequency component of the position error is the highest.

6. The magnetic disk device according to claim 1, wherein the processing unit sets the on-track determination number to a second value when the evaluation value is a first value and sets the on-track determination number to a fourth value when the evaluation value is a third value, and wherein the fourth value is larger than the third value when the second value is larger than the first value.

7. A magnetic disk device, comprising:
   a magnetic disk;
   a magnetic head that accesses the magnetic disk;
   an actuator that causes the magnetic head to seek on the magnetic disk;
   a processing unit that acquires a feature amount from a position error between a demodulated position and an estimated position of the magnetic head based on a frequency resonance characteristic of the actuator or a frequency characteristic of vibration caused by disturbance of the actuator and, based on the feature amount, sets an on-track determination number used for confirming an on-track state of the magnetic head after seeking;
   a voice coil provided at an end portion of the actuator;
   a state observer that calculates an estimated position of the magnetic head based on the demodulated position of the magnetic head and a target value of a VCM current flowing through the voice coil;
   a state feedback control unit that sets the target value of the VCM current based on the position error and outputs the target value of the VCM current to the state observer;
   a filter that has a pass band of a frequency component of the position error, the pass band being set based on the frequency resonance characteristic of the actuator or the frequency characteristic of vibration caused by disturbance of the actuator, receives the position error as an input, and outputs the feature amount;
   an integrator that is connected to a subsequent stage of the filter and predicts an evaluation value by integrating the feature amount of each sample point; and
   an on-track determination number setting unit that is connected to a subsequent stage of the integrator and sets the on-track determination number based on the evaluation value.

8. A method of setting an on-track determination number of a magnetic disk device comprising a magnetic disk, a magnetic head that accesses the magnetic disk, and an actuator that causes the magnetic head to seek on the magnetic disk, the method being performed in the magnetic disk device, and the method comprising:
   acquiring a feature amount from a position error between a current position and an estimated position of the magnetic head based on a frequency resonance characteristic of the actuator or a frequency characteristic of vibration caused by disturbance of the actuator; and
   based on the feature amount, setting an on-track determination number used for confirming an on-track state of the magnetic head after seeking;
   wherein the position error is input to a filter that has a pass band of a frequency component of the position error, the pass band being set based on the frequency resonance characteristic of the actuator or the frequency characteristic of vibration caused by disturbance of the actuator, and the feature amount is output from the filter,
   wherein an evaluation value is predicted based on a result of integrating the feature amount of each sample point, and
   wherein the on-track determination number is set based on the evaluation value.

9. The method of setting the on-track determination number of the magnetic disk device according to claim 8, wherein a seek control based on the position error and the prediction of the evaluation value based on the position error are executed in parallel.

10. The method of setting the on-track determination number of the magnetic disk device according to claim 8, wherein the feature amount is integrated from a position ahead of the target cylinder at seeking by a fixed number of samples.

11. The method of setting the on-track determination number of the magnetic disk device according to claim 9, wherein the feature amount is integrated from a position ahead of the target cylinder at seeking by a fixed number of samples.

12. The method of setting the on-track determination number of the magnetic disk device according to claim 8, wherein the pass band of the filter includes a band of a peak position where a gain of the frequency component of the position error is the highest.

13. The method of setting the on-track determination number of the magnetic disk device according to claim 8,
    wherein the on-track determination number is set to a second value when the evaluation value is a first value and the on-track determination number is set to a fourth value when the evaluation value is a third value, and
    wherein the fourth value is larger than the third value when the second value is larger than the first value.

14. A method of setting an on-track determination number of a magnetic disk device comprising a magnetic disk, a magnetic head that accesses the magnetic disk, and an actuator that causes the magnetic head to seek on the magnetic disk, the method being performed in the magnetic disk device, and the method comprising:
    acquiring a feature amount from a position error between a current position and an estimated position of the magnetic head based on a frequency resonance characteristic of the actuator or a frequency characteristic of vibration caused by disturbance of the actuator;
    based on the feature amount, setting an on-track determination number used for confirming an on-track state of the magnetic head after seeking;
    calculating an estimated position of the magnetic head based on the demodulated position of the magnetic head and a target value of a VCM current flowing through a voice coil provided at an end portion of the actuator;
    determining the target value of the VCM current based on the position error;
    applying the VCM current to the voice coil based on the target value of the VCM current;
    acquiring the feature amount from the filter by inputting the position error to a filter that has a pass band of a frequency component of the position error, the pass band being set based on the frequency resonance characteristic of the actuator or the frequency characteristic of vibration caused by disturbance of the actuator;
    predicting an evaluation value based on a result of integrating the feature amount of each sample point; and
    setting the on-track determination number based on the evaluation value.

* * * * *